(12) United States Patent
Casado Gomez et al.

(10) Patent No.: US 9,066,621 B2
(45) Date of Patent: Jun. 30, 2015

(54) ESPRESSO MACHINE OR FULLY AUTOMATIC COFFEE MACHINE HAVING AUTOMATIC DETERMINATION OF THE GRAIN SIZE DISTRIBUTION AND/OR THE DEGREE OF GRINDING OF GROUND COFFEE

(75) Inventors: Sebastian Casado Gomez, Stuttgart (DE); Jochen Gussmann, Schwaebisch-Gmuend (DE)

(73) Assignee: WMF Wuerttembergische Metallwarenfabrik Aktiengesellschaft, Geislingen/Steige (DE)

( * ) Notice: Subject to any disclaimer, the term of this patent is extended or adjusted under 35 U.S.C. 154(b) by 102 days.

(21) Appl. No.: 13/261,252

(22) PCT Filed: Oct. 13, 2010

(86) PCT No.: PCT/EP2010/006273
§ 371 (c)(1),
(2), (4) Date: Apr. 5, 2012

(87) PCT Pub. No.: WO2011/045055
PCT Pub. Date: Apr. 21, 2011

(65) Prior Publication Data
US 2012/0196009 A1    Aug. 2, 2012

(30) Foreign Application Priority Data
Oct. 13, 2009  (DE) .................. 10 2009 049 229

(51) Int. Cl.
*A47J 31/40* (2006.01)
*A47J 31/42* (2006.01)
*A47J 31/52* (2006.01)

(52) U.S. Cl.
CPC ............ *A47J 31/404* (2013.01); *A47J 31/52* (2013.01); *A47J 31/42* (2013.01)

(58) Field of Classification Search
CPC ........... A47J 31/42; A47J 31/52; A47J 31/56; A47J 31/20; A47J 31/3614
USPC ................... 99/286, 280, 283, 287, 289 R
See application file for complete search history.

(56) References Cited

U.S. PATENT DOCUMENTS 4,767,632 A * 8/1988 Meier ........................ 426/231
5,072,660 A * 12/1991 Helbling ..................... 99/280
(Continued)

FOREIGN PATENT DOCUMENTS

DE    31 07 549 A1    2/1982
DE    36 15 158 C1    11/1990
(Continued)

*Primary Examiner* — Dana Ross
*Assistant Examiner* — Hemant Mathew
(74) *Attorney, Agent, or Firm* — Marshall & Melhorn, LLC (57) ABSTRACT

The present invention relates to an espresso machine or a fully automatic coffee machine having a grinder and an infusion device comprising an infuser and an infusion chamber, which is characterized by a volume-determining portion designed to determine the ground volume of a defined quantity of coffee powder ground by means of the grinder, a mass-determining portion designed to determine the ground mass of this quantity of coffee powder, and a calculation portion with which, on the basis of a predefined correlation, which is stored preferably in the calculation portion itself, between the grain size distribution and/or the degree of grinding of ground coffee, on the one hand, and the mass and the volume or a variable derived from these two variables, in particular the density, of ground coffee, on the other hand, there can be calculated from the determined ground volume and from the determined ground mass, the grain size distribution and/or the degree of grinding of this quantity of coffee powder.

15 Claims, 3 Drawing Sheets

(56) References Cited

U.S. PATENT DOCUMENTS

| | | | |
|---|---|---|---|
| 5,407,138 A * | 4/1995 | Graenicher et al. | 241/6 |
| 7,798,055 B2 * | 9/2010 | Mandralis et al. | 99/295 |
| 7,927,642 B2 * | 4/2011 | Campetella et al. | 426/433 |
| 2008/0190297 A1 | 8/2008 | Gussmann et al. | |
| 2010/0095852 A1 * | 4/2010 | Remo et al. | 99/280 |

FOREIGN PATENT DOCUMENTS

| | | |
|---|---|---|
| DE | 10 2007 063 166 A | 6/2009 |
| JP | 2000-339537 A | 12/2000 |
| JP | 2001-167354 A | 6/2001 |
| JP | 2002-253122 A | 9/2002 |
| JP | 2005-230548 A | 9/2005 |
| JP | 2008-194468 A | 8/2008 |
| WO | WO 2008/105017 A1 | 9/2008 |

* cited by examiner

| Ratio m/V [g/cm³] | Grain size distribution (x₆₃,₂) |
|---|---|
| . | . |
| . | . |
| . | . |
| 0,525 | 390 µm |
| 0,502 | 450 µm |
| 0,479 | 510 µm |
| 0,469 | 570 µm |
| . | . |
| . | . |
| . | . | a)

| h₂ [mm] | Ground mass [g] |
|---|---|
| 4 | 5 |
| 5 | 6 |
| 6 | 7 |
| 7 | 8 |
| 8 | 9 |
| 9 | 10 |
| . | . |
| . | . |
| . | . |
| 17 | 18 |
| 18 | 19 |

Fig. 3

ESPRESSO MACHINE OR FULLY AUTOMATIC COFFEE MACHINE HAVING AUTOMATIC DETERMINATION OF THE GRAIN SIZE DISTRIBUTION AND/OR THE DEGREE OF GRINDING OF GROUND COFFEE

BACKGROUND OF THE INVENTION

The present invention relates to an espresso machine or a fully automatic coffee machine having a grinder and an infusion device comprising an infuser and an infusion chamber.

The grain size distribution in a quantity of ground coffee powder or of ground coffee beans has a decisive influence on the infusion time of the coffee, the appearance and the taste of the finished coffee drink (for example espresso, café crème). This can be attributed to the fact that the grain size distribution determines inter alia the resistance of the ground coffee which the ground coffee offers to the water when water flows through the ground coffee, and hence the infusion time of the coffee.

Within the scope of the present invention, there is understood by grain size distribution, the frequency distribution of the average particle diameter of a defined quantity of ground coffee beans. In the case of a prescribed grinding disc spacing of the grinder, this grain size distribution typically has, both in the upper range of the grain sizes (coarse proportion) and in the lower range of the grain sizes (fine proportion), a local maximum in the frequency distribution: the grain size distribution can be characterised by the so-called $x_{63.2}$ value. This value is defined such that 63.2% of the grains of a given grain size distribution have a smaller size than the $x_{63.2}$ value. The $x_{63.2}$ value can also be termed degree of grinding (also a different size value characterising the grain size distribution being able to be used as degree of grinding).

These two variables (grain size distribution and degree of grinding) are also used synonymously subsequently for simplification.

To date, the grain size distribution and/or the degree of grinding which an espresso machine or a fully automatic coffee machine delivers (such a machine is subsequently termed alternatively also fully automatic coffee machine or in brief coffee machine) has only been able to be assessed optically approximately or determined indirectly via the infusion time. However the latter also depends upon the metered quantity and the pressing force of the ground coffee in the infuser of the coffee machine. Adjustment of the grinder (subsequently also termed mill for simplification) of the coffee machine during production of the same has to date been effected merely via the grinding disc spacing, i.e. the spacing of the individual grinding discs of the grinder.

However, the grain size distribution only correlates partially with the spacing of the grinding discs and is subject to further non-adjustable variables, such as the plane-parallelism or the fine tooth depth of the respective pair of grinding discs. Adjustment of the grain size distribution via the grinding disc spacing cannot hence be ensured unequivocally and reproducibly. Very different degrees of grinding in the output of the coffee machine result therefrom despite the same adjustment of the degree of grinding. Furthermore, further factors, such as for example the type of beans or the degree of roasting, influence the grain size distribution, however these further factors are known in part only to the end customer. The degree of grinding is therefore adjusted only for the end customer of the coffee machine at the moment according to feeling (according to the taste of the coffee, according to the optical assessment of ground coffee grounds and/or according to the infusion time) by a customer services technician of the manufacturer of the coffee machine. Upon changing the type of beans or wear and tear of the grinding discs, renewed adjustment of the degree of grinding is hence required.

BRIEF SUMMARY OF THE INVENTION.

The object of the present invention is therefore to make available an espresso machine or a fully automatic coffee machine which enables automatic determination of the grain size distribution, which therefore makes it possible that the grain size distribution, which the respective grinder provides at the moment and in the context of the type of beans used and the given spacing of the grinding discs, can be determined and possibly adapted also to a desired value. Furthermore, it is the object of the invention to make available a corresponding method for determining the grain size distribution and/or the degree of grinding.

This object is achieved by an espresso machine or a fully automatic coffee machine according to claim 1 and by a method according to claim 15. Advantageous embodiment variants can be deduced respectively from the dependent claims.

Subsequently, the present invention is described firstly in general, then with reference to an embodiment. The individual features which are produced in the embodiment in combination with each other need not be produced precisely in the shown combination, within the scope of the present invention (the scope of which is established by the patent claims), rather it can also be produced in different combinations. Within the scope of the present invention, in particular also individual features shown in the embodiment can be omitted or used in a different configuration.

The basic idea of the present invention is that the ground coffee density (i.e. the density of ground coffee powder, measured for example in $g/cm^3$) is inter alia dependent upon the grain sizes which such a grinding comprises.

Therefore coarse grindings with a predominantly coarse grain structure (predominantly large grains in the grain size distribution) have a smaller mass in a specific cubic measure than finer grindings (predominantly small grains in the grain size distribution), in the case of which smaller grains fill the intermediate spaces better. In other words, the ground coffee density depends upon the grain size distribution; there is an (at least approximately) unequivocal correlation between these two variables.

Within the scope of the present invention, there is understood by the mass, the volume or the density of a defined quantity of coffee powder, not exclusively the exact physical value of the mass, the volume or the density of this quantity of coffee powder but also variable values (characteristic of this quantity of coffee powder) which are determined via the measuring methods subsequently described also in detail and which are in an unequivocal correlation with these exact physical values and/or which unequivocally characterise these exact physical values (i.e. for example variable values which scale linearly with the exact physical values).

Hence it is not crucial in the present invention that the exact density, the exact volume or the exact mass are determined but that variable values unequivocally characterising these physical values are obtained and evaluated under unequivocal and reproducible measuring conditions (e.g. with a defined pressing force).

Hence firstly by determining the mass and the volume of a defined grinding (or of variables characterising these physical values), the density or a variable of this grinding characterising said density can be determined and conclusions can be drawn from this density with respect to the grain size distribution or the degree of grinding of the grinding.

For this purpose, the coffee machine according to the invention has a volume-determining portion designed to determine the ground volume of a quantity of ground coffee powder, a mass-determining portion designed to determine the ground mass of this quantity of coffee powder and a calculation portion, wherein, with the latter, on the basis of a predefined correlation between the grain size distribution and/or the degree of grinding of a grinding, on the one hand, and the mass and the volume or a variable, derived from these two variables (e.g. the density), of the grinding, on the other hand, there can be calculated from the ground volume determined with the volume-determining portion and the ground mass of the grinding determined with the mass-determining portion, the grain size distribution and/or the degree of grinding of the grinding.

The volume-determining portion, the mass-determining portion and the calculation portion can thereby be produced within the scope of an individual component assembly of the coffee machine according to the invention. In an advantageous variant, the volume determination and/or the mass determination of the grinding or of the defined quantity of coffee powder is effected in the infusion chamber of the infusion device of the coffee machine. However, it is basically also possible to provide, in the coffee machine, a separate collection chamber (regarded with reference to the infusion chamber) which is designed to receive a defined quantity of ground coffee powder and in which or with which the ground volume and/or the ground mass can be determined.

Advantageously, this determination takes place with the help of a pressing element which is designed to compress the defined quantity of coffee powder in the collection chamber (or in the infusion chamber). This pressing element can concern for example an infusion piston of the infusion device; the infuser of the infusion device is designed in this case as an infusion cylinder in which (as pressing element) the infusion piston is displaceable.

As is described subsequently in more detail, the volume determination of the defined quantity of coffee powder or of the grinding (with the help of the volume-determining portion) is effected advantageously by dry-pressing of the quantity of coffee powder and by determining a position and/or a travel path of the pressing element during or after such dry-pressing of the quantity of coffee powder.

The mass determination of the defined quantity of coffee powder is effected advantageously on the basis of wet-pressing of the quantity of coffee powder and likewise on the basis of determination of a position and/or of a travel path of the pressing element after or during this wet-pressing. On the basis of this position and/or this travel path, firstly the wet-pressing volume of the pressed quantity of coffee powder can thereby be determined and, from this wet-pressing volume, the ground mass, by means of a predefined correlation between the mass of ground coffee, on the one hand, and the wet-pressing volume of the ground coffee, on the other hand.

Compression of the quantity of coffee powder during dry-pressing and during wet-pressing is effected advantageously at constant pressing forces, the quantity of coffee powder in the dry state being compressed with less pressing force than in the wet state.

Preferably, with one and the same quantity of ground coffee, firstly a dry-pressing process is implemented hereby in order to determine the ground volume and subsequently (after wetting this quantity of ground coffee) a wet-pressing process in order to determine the ground coffee mass. Already from these two values, a density value can be reliably determined, with which value the grain size distribution and/or the degree of grinding can then be calculated with the above-described correlation.

However, it is of course also possible to implement in succession respectively dry-pressing and wet-pressing with a plurality of defined quantities of coffee powder, hence to determine a plurality of individual density values as described above and then to average these density values. From the corresponding average, the degree of grinding or the grain size distribution can then be calculated from the previously described correlation.

In order to determine the ground volume and/or the ground mass of the quantity of coffee powder, in particular in order to determine the previously described position and/or the previously described travel path (from which then the ground volume and the ground mass can be derived), a large number of possible sensor components can be used within the scope of the present invention: thus, for example the number of revolutions about the spindle axis of a spindle driving the pressing element (drive with the help of a drive motor) can be detected in order to determine finally the sought position and/or the sought travel path from this number of revolutions.

Alternatively, a position-recognition sensor, based on a Hall element, a photoelectric barrier, an ultrasound-based position-recognition sensor or a capacitive position-recognition sensor can be used. The construction of such sensor components or elements is known to the person skilled in the art.

Within the scope of the present invention, it is also possible to determine the pressing force (or the pressing force course) during compression of the quantity of coffee powder (this can be implemented for example by measuring and evaluating the current consumption of a drive motor driving the pressing element): this pressing force determination serves to ensure the reproducibility of the measuring conditions, by for example a defined quantity of coffee powder being compressed only until reaching a predefined pressing force and then, upon reaching this pressing force, pressing being ended and the filling level of the coffee powder in the infusion chamber being determined (see subsequent embodiment).

Finally, the coffee machine according to the invention has, in an advantageous variant, an adjustment and control device with which a parameter which influences the grain size distribution and/or the degree of grinding of the grinding can be changed. For example, the grain size distribution and/or the degree of grinding can hereby be determined firstly for a defined quantity of coffee powder, as previously described, and, with the specific value, the average spacing of two grinding discs of the grinder can then be changed until renewed determination of the grain size distribution and/or of the degree of grinding after a changed spacing produces the desired grain size distribution and/or the desired degree of grinding.

BRIEF DESCRIPTION OF THE DRAWINGS

The present invention is described subsequently with reference to an embodiment: There are shown FIG. 1 the construction of the fully automatic coffee machine according to this embodiment (schematic representation) and FIG. 2 an example of a correlation, used according to the invention, between the degree of grinding of a quantity of coffee powder and the density of this quantity of coffee powder.

DETAILED DESCRIPTION OF THE INVENTION

Figure 1:
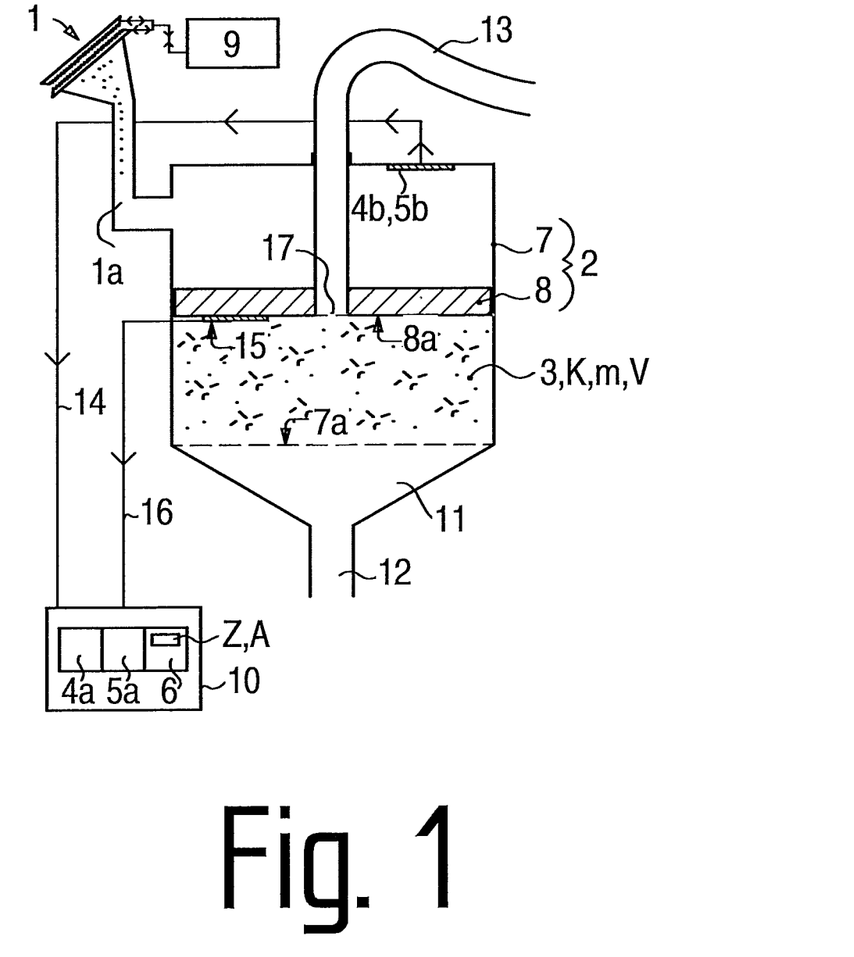

The fully automatic coffee machine represented in FIG. 1 only as a section has a grinder 1 having two individual grinding discs. The ground coffee ground by the grinder 1 passes via a supply portion 1a into the interior of an infusion cylinder 7. In this infusion cylinder 7, the infusion piston 8 is disposed moveably. The infusion cylinder 7 and the infusion piston 8, which is disposed moveably in the interior of said cylinder in the direction of the cylinder axis, together form the infuser 2 of the infusion device of the fully automatic coffee machine.

Between an end-face 8a of the infusion piston 8 (here the end-face of the infusion piston 8 situated at the bottom) and an end-face 7a of the infusion cylinder 7, which face is situated opposite this end-face 8a, the infusion chamber 3 of the infusion device of the fully automatic coffee machine is configured.

As the Figure shows, if the infusion piston 8 is disposed in the furthest possible withdrawn state (i.e. in the illustrated case, pushed back as far as possible upwards) a connection between the supply portion 1a and the infusion chamber 3 is formed, by means of which the ground coffee grounds can be transferred into the infusion chamber 3. In the illustrated state (infusion piston 8 displaced downwards), this connection is then closed (with a closing element which is not shown) so that, in the illustrated state, no further ground coffee can be supplied to the infusion chamber 3.

The cylinder cover end-face 7a, situated at the bottom, or the corresponding infusion cylinder end is configured in the present case as a flat filter which is disposed parallel to the infusion piston end 8a, situated at the bottom, of the infusion piston 8, and through which only water can pass (after flowing through the coffee powder disposed in the infusion chamber 3 above this filter).

By displacing the infusion piston 8 downwards along the cylinder axis of the infusion cylinder 7 (reduction in the spacing of the mutually facing end-faces 7a, 8a), the quantity of coffee powder K disposed in the infusion chamber 3 is compressed. In the centre of the infusion piston 8, there is disposed a water outlet opening 17 to which hot water provided for flowing through the coffee powder 3 can be supplied via a tube 13 which is disposed along the cylinder axis of the infusion cylinder 7 and leads upwards away from the end-face 8a. This water supply takes place, in the case of a compressed quantity of coffee powder K in the infusion chamber, at sufficiently high pressure so that the hot water is pressed through the compressed quantity of coffee powder K and subsequently, via the filter 7a, enters into the outlet chamber 11 disposed below the filter 7a and can be discharged via the outlet 12 connected at the bottom (which has a valve, not shown).

With the previously described components of the fully automatic coffee machine, calculation of the grain size distribution of the quantity of coffee powder K is effected, according to the invention, in two steps as follows (however also a different step sequence or partial step sequence can be produced within the scope of the invention):

Step 1: Volume Determination

Firstly, determination of the ground volume V of the predefined quantity of coffee powder K in the infusion chamber 3 of the infusion device is effected by the amount of coffee beans corresponding to the quantity K being ground by means of the grinder 1 and the ground product being supplied via the connection portion 1a to the infusion chamber 3. The infusion piston 8 is then pressed against the quantity of coffee powder K at a predefined, constant first pressing force (dry-pressing force). This first pressing force which is required for compressing the coffee powder K in the dry state can be achieved for example with the help of a spring element, not shown here. Pressing is thereby ended after reaching the first pressing force, i.e. the infusion piston 8 is "frozen" at the reached position, i.e. retained at this position, and, as described subsequently, the compressed volume V is determined.

The compressed volume V of the quantity of coffee powder K (or the remaining space of the infusion chamber 3), which is produced with the help of the stamp or the infusion piston end 8a, is now determined as follows: on the inner internal wall of the upper cylinder cover surface, situated at the top (i.e. outside the infusion chamber 3 and above the infusion piston 8), the infusion cylinder 7 has an ultrasound sensor element which is provided here with the reference numbers 4b, 5b. With the help of this ultrasound sensor element, the momentary position of the pressing element or infusion piston 8 inside the infusion cylinder 7 can be established in a manner known to the person skilled in the art. With reference to this position, the filling level $h_1$ of the coffee powder in the infusion chamber 3, compressed in a defined manner, can be determined and therefrom (given a cylindrical infusion chamber with radius r) the remaining volume in the infusion chamber 3 or the ground volume V of the dry compressed coffee powder K can be determined according to $V = h_1 \cdot r^2 \cdot \pi$. For this purpose, the corresponding position measuring value of the ultrasound sensor element 4b, 5b is transmitted via a measuring data line 14 to a microcontroller 10. In the microcontroller 10, a portion 4a (here a memory portion of the microcontroller 10 in which a corresponding evaluation program has been loaded) is disposed, which calculates the sought ground volume V from the previously described measuring value.

In the present case, the volume-determining portion 4 according to the invention hence comprises the ultrasound sensor element 4b, 5b, the measuring data line 14 and the portion 4a of the microcontroller 10, and determination of the sought ground volume V takes place via evaluation of the level of the ground coffee cake on the basis of the infuser position or the infuser travel path. The above-described, constant first pressing force (dry-pressing force) is for example 100 N.

In the embodiment, the collection chamber which is used to receive the quantity of coffee powder K to be evaluated is hence identical to the infusion chamber 3. As an alternative thereto (not shown here), also a separate collection chamber, in which then the quantity of coffee powder can be evaluated in a corresponding manner with respect to the ground volume V (and also with respect to the ground mass M, see subsequently), can however be used.

As an alternative to the illustrated embodiment, the infuser position or the volume of the infusion chamber 3 can however be determined also by determining the rotation of a spindle or of a motor driving this spindle (in this case, the infusion piston 8 is designed as spindle; the infusion piston 8 is hence moved up and down in the infusion cylinder 7 by means of a thread movement). For this purpose, a Hall sensor which determines the number of revolutions of the motor with the help of a magnet fitted on the spindle can be used.

In further alternative embodiments, the ground volume V of the quantity of coffee powder K in the infuser can be measured also directly via a photoelectric barrier or a capacitive sensor. Such sensors also are known to the person skilled in the art.

In the step for volume determination according to the invention, the infusion chamber volume or the ground volume in the infusion chamber (for example in cm$^3$) is hence determined from the infuser position. The sought degree of grinding or the sought grain size distribution of the ground coffee influences this volume.

Step 2: Determination of the Ground Mass m

By means of the tube 13, hot water (or even cold water) is now supplied to the (already compressed) ground coffee K in the infusion chamber 3 via the outlet 17 which is disposed centrally in the infusion piston 8. With this, the ground coffee grains swell up so that, if these swollen grains are compressed at a sufficiently high force, the sought mass of the quantity of ground coffee, irrespective of the original (dry) grain size distribution, is proportional to the compressed volume (or to the filling level in the infusion chamber). After the water supply, the already compressed, wet ground coffee is hence further compressed by means of a predetermined second, constant pressing force which is greater by at least the factor 5, preferably by at least the factor 10, than the pressing force chosen in step 1. This second pressing force is also produced with the help of the (not shown) spring unit of the infusion piston 8; the second pressing force is hereby significantly greater than the (dry) pressing force chosen in step 1. For example, a value of 1,000 N is used for the second (wet) pressing force. There then applies for the sought mass m: $m \sim V = h_2 \cdot r^2 \cdot \pi$ (with h2=the determined filling level in the wet state). Preferably, the ratio of wet- to dry-pressing force is approx. 10 to 20 (wherein this ratio, regarded theoretically, given a sufficiently large dry-pressing force in order to achieve a compact, reproducible dry volume, should be as large as possible).

As described above, after further compression of the ground coffee K with the help of the ultrasound sensor unit 4b, 5b, the still remaining infusion chamber volume of the infusion chamber 3 or the wet-pressed volume of the quantity of coffee powder K is determined again. For this purpose, the sensor unit 4b, 5b emits a corresponding measured value via the measuring data line 14 to a further portion 5a configured in the microcontroller 10 (this further portion 5a is also designed here as a memory portion of the microcontroller 10, which portion is loaded with a suitable evaluation programme).

The mass-determining unit 5 in the present case hence comprises the sensor 4b, 5b, the measuring data line 14 and the portion 5a. Hence the embodiment produces a case in which the volume-determining portion 4 and the mass-determining portion 5 are formed by one and the same physical component. However, also different components can be used to form the volume-determining portion 4 and the mass-determining portion 5.

The sought ground mass m of the coffee powder K compressed in the infusion chamber 3 is now calculated as follows from the determined wet-pressed volume (second infusion chamber volume): in a memory portion of the calculation portion 6 designed as part of the microcontroller 10, a predefined table (for example: look-up table) A is stored. This table A describes a correlation between the mass of ground coffee powder, on the one hand, and the wet volume of the coffee powder which is thus ground, on the other hand. After supply of the corresponding wet measured value of the sensor 4b, 5b, via the measuring data line 14, the portion 5a and the calculation portion 6 can hence calculate the sought ground mass m (for example: mass calculation in g) on the basis of the table A from the detected wet volume.

For production of the predefined table A, a known mass of ground coffee is introduced into the test vessel (here: infusion chamber 3) and, with the addition of water, a constant force (as previously described here: 1,000 N) is applied via the pressing element (infusion piston 8). During the force effect (or if a further reduction in volume in the infusion chamber is no longer effected, if therefore the compressed ground coffee offers so much resistance to the infusion piston that the infusion piston comes to a standstill), the level $h_2$ is determined as previously described. From this level, the associated volume V of the known mass in the infusion chamber is produced then as previously described via $V = h_2 \cdot r^2 \cdot \pi$.

This process is repeated with constantly the same force (e.g. 1,000 N) and variable ground coffee masses. From the results, a linear equation is subsequently obtained (by means of mathematical fit methods known to the person skilled in the art), with the help of which the sought mass m can be determined in the calculation portion 6 from a value of $h_2$ (or the associated volume V) which is determined during pressing.

Figure 3:
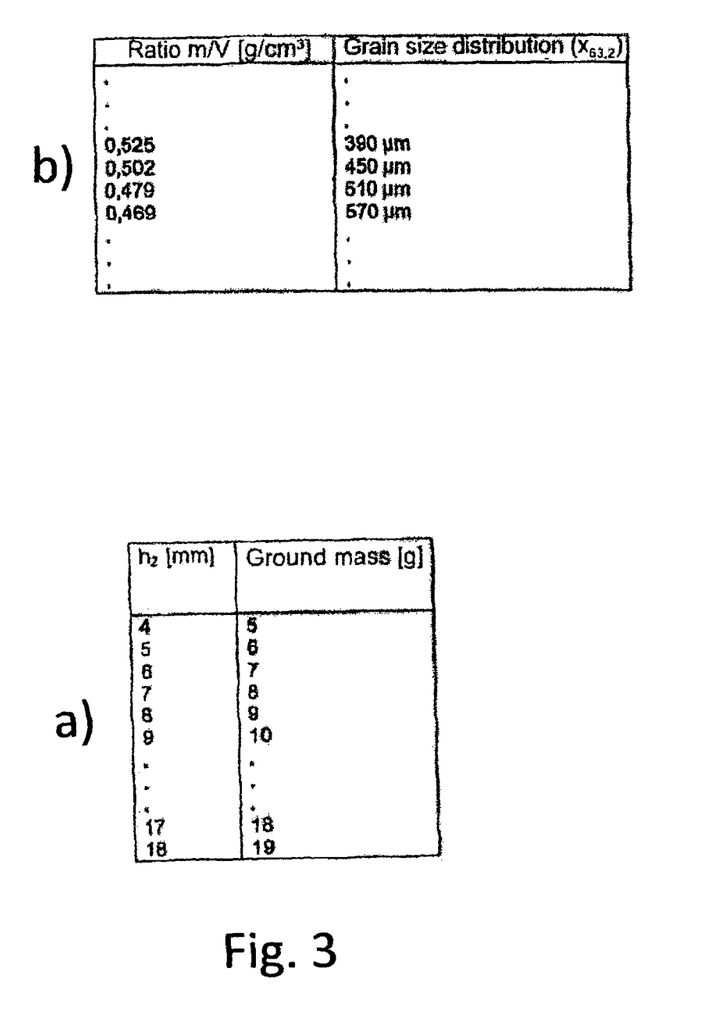
FIG. 3 shows two tables for determined correlations between physical variables.

FIG. 3a shows an example of such a calculation table A.

After the two values, ground volume V and ground mass m, have been determined or calculated, determination of the sought degree of grinding or the sought grain size distribution is then effected as follows: the ratio m/V is formed, i.e. the density of the quantity of coffee powder K (for example in g/cm$^3$) is calculated. In a memory portion of the calculation unit 6, the correlation Z (for example likewise in the form of a table or look-up table) between the grain size distribution and/or the degree of grinding of ground coffee is stored, on the one hand, and the density of the ground coffee, on the other hand.

Figure 2:
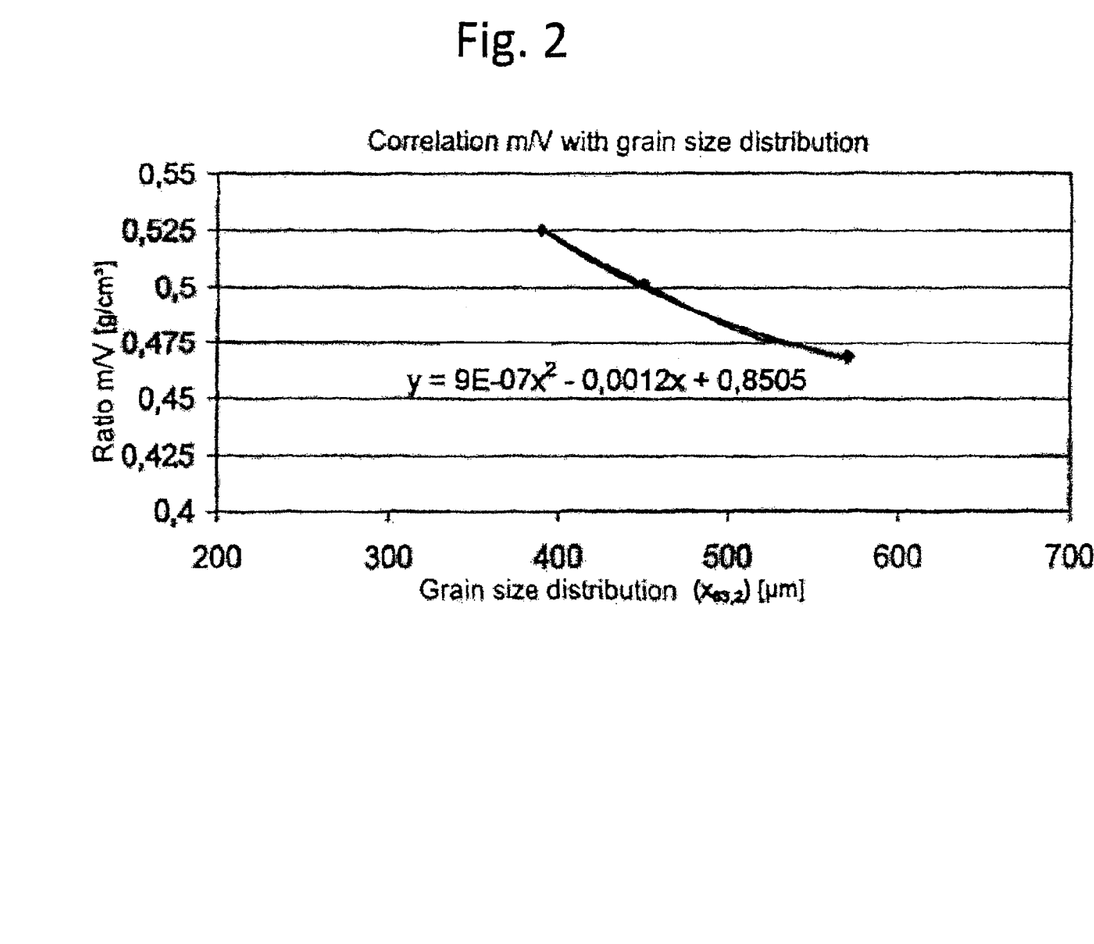

FIG. 2 shows an example of such a correlation Z, stored in a table, between the grain size distribution of a quantity of coffee powder K (in the form of the degree of grinding) and the associated density of the quantity of coffee powder.

In the coffee machine software, for example on the basis of a formula derived from experiments, a look-up table Z can hence be stored, with which table a grain size distribution can be assigned to each determined density value.

The calculation unit 6 therefore calculates the sought grain size distribution or the sought degree of grinding on the basis of the formed density value mN from this table Z.

For determination of the correlation Z, ground coffee of a known mass and a known grain size distribution (or with a known degree of grinding or $x_{63.2}$ value) is introduced into the test vessel (infusion chamber 3) and a constant force of for example 100 N here is applied via the pressing element (infusion piston 8). As described previously, no water is hereby added (dry-pressing). During the force effect (or if the compressed, dry ground coffee offers so much resistance to the pressing element that the latter no longer moves), the level h1 is determined as described above. The volume V is calculated from the level $h_1$ according to $V = h_1 r^2 \cdot \pi$. Since the mass of the ground coffee is known, the ratio mN and hence the associated density can be formed.

This process is repeated with constantly the same force (100 N) and ground mass and with variable grain size distributions (or $x_{63.2}$ values). The smaller are the graduations thereby of the grain size distributions (or of the $x_{63.2}$ values), the more precisely can the calculation be effected later. From the results, an equation can subsequently be generated with the help for example of a polynomial-based fit method (cf. FIG. 2), with the help of which equation the sought associated grain size distribution (or the $x_{63.2}$ value) can be determined in the calculation portion 6 from a ratio mN. FIG. 2 shows a corresponding correlation Z, FIG. 3b shows the associated measured values as an example.

In order to minimise a possible scattering of the result, the determination of the density can be repeated several times according to the invention, as described previously, an average can then be formed from the thus determined density values and can be used to calculate the sought grain size distribution.

The fully automatic coffee machine of the embodiment has, in addition to the previously described elements, an adjustment and control device 9 (which in turn comprises a servomotor, not shown). This adjustment and control device 9 is connected to the calculation unit 6 for data exchange (not shown). On the basis of a grain size distribution determined as described previously, the unit 9 allows adaptation of the spacing of the two grinding discs of the grinder 1. If hence the determined grain size distribution shows an undesired value, then the grinder 1 of the fully automatic coffee machine can be readjusted on the basis of this value. By means of renewed determination of the grain size distribution, as described previously, and possibly renewed control with the unit 9, a desired adjustment of the fully automatic coffee machine with respect to the degree of grinding or the grain size distribution can be undertaken gradually and automatically.

On the side 8a of the infusion piston 8 which is situated at the bottom, i.e. orientated towards the infusion chamber 3, the fully automatic coffee machine of the embodiment has in addition a pressure sensor 15, the measured values of which can be transmitted to the microcontroller 10 by means of a data line 16. This sensor 15 serves for determination of the momentary pressing force (for example the dry-pressing force or wet-pressing force described previously) and hence for switching off the pressing after reaching a predetermined force or for ensuring reproducible measuring conditions. As an alternative thereto, the pressing force of the infuser can however also be determined via evaluation of the current consumption of an infuser motor which is used for pressing the infusion piston 8 against the quantity of coffee powder K. A piezosensor for example can be used as sensor 15; also other direct force measuring methods are possible.

Relative to the previously described, known possibilities for determining the grain size distribution, the present invention has a series of essential advantages:

A saving in ground coffee and time thus results according to the invention since, in a successive process (the above-described two steps), both dry-pressing and wet-pressing can be implemented with one and the same ground coffee and with a low time requirement.

The previously described measuring process can also be implemented during the coffee infusion so that the possibility exists, even during the infusions, of checking the degree of grinding and possibly making an adjustment.

By means of the previously described adjustment and control device, the espresso machine or the fully automatic coffee machine can be adjusted automatically to a desired degree of grinding or be readjusted automatically in the case of changes (e.g. when using a different type of beans and/or when the grinding discs become worn).

The grain size distribution can be determined and adapted rapidly and simply, and without-additional aids.

Together with the grain size distribution, the milling characteristics, i.e. the dependency of the degree of grinding upon the grinding output in g per unit of time, can be determined in one process: degree of grinding and mass are determined as described above, the grinding output is obtained by simple time measurement.

The thus determined milling characteristics can be used for example to indicate and to adjust the amount of coffee used in g.

Specimen scatterings of espresso machines or fully automatic coffee machines (for example on the basis of grinding disc tolerances) are now easy to deal with and can be applied to a robust grinding process.

By means of cyclical, automatic testing, the running-in and/or wear behaviour of the machine or of the mill with respect to the grain size distribution can be detected and corrected. Also an increase or a decrease in the metering quantity (quantity of ground coffee ground per unit of time) can be detected automatically and compensated for via software by means of a shorter or longer grinding duration, for example by increasing correspondingly the length of the time interval of the grinding by lowering the quantity of ground coffee ground within a defined time interval.

Via the determined grain size distribution, a prognosis for the infusion time can be produced; also pre-treatment methods (for example relating to the type of wet-pressing) can be proposed: the less the determined degree of grinding or the $x_{63.2}$ value, the higher can the infusion time be adjusted.

Adjustment limits can be determined and exceeding these limits can be indicated. Hence mechanical input in the machine can be dispensed with; likewise manual weighing of the ground coffee.

The invention claimed is:

1. An espresso machine or fully automatic coffee machine, comprising:
    a grinder and an infusion device comprising an infuser and an infusion chamber;
    a volume-determining portion designed to determine a ground volume of a quantity of coffee powder, ground by way of the grinder;
    a mass-determining portion designed to determine a ground mass of the quantity of ground coffee powder; and
    a calculation portion having a memory portion with a first predefined table (A) stored therein that describes a correlation between the mass of the ground coffee powder and the volume of the ground coffee powder, and a second predefined table (Z) stored therein that describes a correlation between a grain size distribution of the ground coffee powder and a density of the ground coffee powder;
    wherein there is calculated from the ground volume and ground mass a group consisting of 1) the grain sieze distribution of the ground coffee powder and 2) an $x_{63.2}$ value degree of grinding of the quantity of ground coffee powder;
    wherein 63.2% of the grains of a given grain size distribution have a smaller size than the $x_{63.2}$ value.

2. The espresso machine or fully automatic coffee machine according to claim 1, further comprising a collection chamber which is designed to receive the defined quantity of ground coffee powder, and a pressing element which is designed to compress the defined quantity of coffee powder in the collection chamber.

3. The espresso machine or fully automatic coffee machine according to claim 2, wherein the infuser has an infusion cylinder as the pressing element, an infusion piston which is displaceable in the infusion cylinder and the collection chamber being the infusion chamber configured in the infusion cylinder between one infusion piston end and the infusion cylinder end situated opposite the infusion piston end.

4. The espresso machine or fully automatic coffee machine according to claim 1, wherein the volume-determining portion is designed to determine a position of the pressing element after pressing of the quantity of coffee powder and/or a travel path of the pressing element during such pressing and to determine the ground volume of the quantity of coffee powder on the basis of the position and/or the travel path, and/or the mass-determining portion is designed to determine a position of the pressing element after pressing of the quantity of coffee powder and/or the travel path of the pressing element during such pressing and to determine the ground mass of the quantity of coffee powder on the basis of the position and/or the travel path.

5. The espresso machine or fully automatic coffee machine according to claim 1, wherein the volume-determining portion is designed to determine a position of the pressing element after dry-pressing of the quantity of coffee powder and/or a travel path of the pressing element during such pressing and to determine the ground volume of the quantity of coffee powder on the basis of the position and/or the travel path, and/or the mass-determining portion is designed to determine a position of the pressing element after wet-pressing of the quantity of coffee powder and/or the travel path of the pressing element during such pressing and to determine the ground mass of the quantity of coffee powder on the basis of the position and/or the travel path.

6. The espresso machine or fully automatic coffee machine according to claim 5, wherein the ground mass of the quantity of coffee powder being able to be determined by firstly the position of the pressing element after wet-pressing of the quantity of coffee powder and/or the travel path of the pressing element during such wet-pressing being determined, thereupon, from the position and/or the travel path, a wet-pressed volume of the quantity of coffee powder being determined and finally, from the determined wet-pressed volume, by means of a predefined correlation between the mass of ground coffee, and the wet volume of the ground coffee, the ground mass of the quantity of coffee powder being calculated.

7. The espresso machine or fully automatic coffee machine according to claim 2, wherein the compression of the quantity of coffee powder in the collection chamber can be accomplished with a predefined pressing force course, and/or the infusion device is designed such that, with the pressing force course, the quantity of coffee powder can be compressed optionally in a dry state or in a wet state.

8. The espresso machine or fully automatic coffee machine according to claim 2, wherein the compression of the quantity of coffee powder in the collection chamber can be accomplished with at least one constant, a predefined pressing force, and/or the infusion device is designed such that, with the predefined pressing force, the quantity of coffee powder can be compressed optionally in the dry state or in the wet state.

9. The espresso machine or fully automatic coffee machine according to claim 2, wherein the compression of the quantity of coffee powder in the collection chamber can be accomplished with at least one constant, a predefined pressing force, and/or the infusion device is designed such that, with the predefined pressing force, the quantity of coffee powder can be compressed optionally in the dry state or in the wet state;

the quantity of coffee powder being able to be compressed by the pressing element at a predefined constant, a first pressing force in the dry state and/or the quantity of coffee powder being able to be compressed by the pressing element at a predefined constant, a second pressing force in the wet state.

10. The espresso machine or fully automatic coffee machine according to claim 9, wherein the second pressing force is greater than the first pressing force by at least the factor 5.

11. The espresso machine or fully automatic coffee machine according to claim 2, further comprising a spindle which can be moved by means of a drive motor and drives the pressing element, the number of revolutions of which about the spindle axis can be detected, a Hall element-based position-recognition sensor, a photoelectric barrier, an ultrasound-based position-recognition sensor and/or a capacitive position-recognition sensor, by means of which a position of the pressing element after pressing of the quantity of coffee powder and/or a travel path of the pressing element during pressing of the quantity of coffee powder can be determined.

12. The espresso machine or fully automatic coffee machine according to claim 2, wherein a pressing force and/or a pressing force course of the pressing element can be established, the being able to be accomplished by measuring and evaluating the current consumption of a drive motor driving the pressing element, and/or the pressing by the pressing element can be frozen in a reached state upon reaching a predefined pressing force.

13. The espresso machine or fully automatic coffee machine according to claim 1, wherein the volume-determining portion, the mass-determining portion and the calculation unit, the ground volume, the ground mass and therefrom a density of one and the same ground quantity of coffee powder can be calculated several times and/or the ground volumes, the ground masses and therefrom densities of different quantities of ground coffee can be calculated, a density average can be calculated from these density values and in that the grain size distribution and/or the degree of grinding of the quantity(ies) of coffee powder can be calculated from the density average with the predefined correlation.

14. The espresso machine or fully automatic coffee machine according to claim 1, further comprising an adjustment and control device for changing a parameter of the grinder which influences the grain size distribution and/or the degree of grinding of quantities of coffee powder to be ground by the grinder with reference to the grain size distribution and/or the degree of grinding determined for a defined quantity of coffee powder, and/or the volume-determining portion, the mass-determining portion and/or the calculation portion have a plurality of common component(s) and/or are designed as a common component assembly of the espresso machine or of the fully automatic coffee machine.

15. The espresso machine or fully automatic coffee machine according to claim 1, wherein the volume-determining portion and/or the mass-determining portion is designed to determine the ground volume and/or the ground mass of the quantity of coffee powder present in the infusion chamber.

* * * * *